United States Patent [19]
Northrup, Jr. et al.

[11] 3,991,741
[45] Nov. 16, 1976

[54] ROOF-LENS SOLAR COLLECTOR

[76] Inventors: Leonard L. Northrup, Jr., 4312 Westway, Dallas, Tex. 75205; Mark J. O'Neill, 11243 Lanewood Circle, Dallas, Tex. 75218

[22] Filed: Mar. 20, 1975

[21] Appl. No.: 560,303

[52] U.S. Cl. .............................. 126/271; 350/247; 237/1 A
[51] Int. Cl.² ............................................ F24J 3/02
[58] Field of Search ............ 126/270, 271; 237/1 A; 350/247, 258; 165/47, 48

[56] References Cited
UNITED STATES PATENTS

| | | | |
|---|---|---|---|
| 937,013 | 10/1909 | Severy | 126/271 |
| 2,888,007 | 5/1959 | Tabor | 126/270 |
| 3,182,654 | 5/1965 | Culling | 126/270 |
| 3,866,285 | 2/1975 | Clark | 126/271 |
| 3,868,823 | 3/1975 | Russell, Jr. | 126/270 |

FOREIGN PATENTS OR APPLICATIONS

| | | | |
|---|---|---|---|
| 1,421,541 | 11/1965 | France | 126/271 |
| 635,283 | 12/1927 | France | 126/271 |
| 456,406 | 6/1913 | France | 126/271 |

*Primary Examiner*—Kenneth W. Sprague
*Assistant Examiner*—James C. Yeung
*Attorney, Agent, or Firm*—Richards, Harris and Medlock

[57] ABSTRACT

An array of linear lenses is used as a combination roof-skylight-solar collector. The lenses are oriented at a given latitude to face the most remote of the earth's poles inclined by the local latitude angle. Moving absorbers are used to receive the sunlight at the focal spot of each lens. The absorbers move back and forth during the day as the sun's position changes, causing the focal spots to move.

16 Claims, 10 Drawing Figures

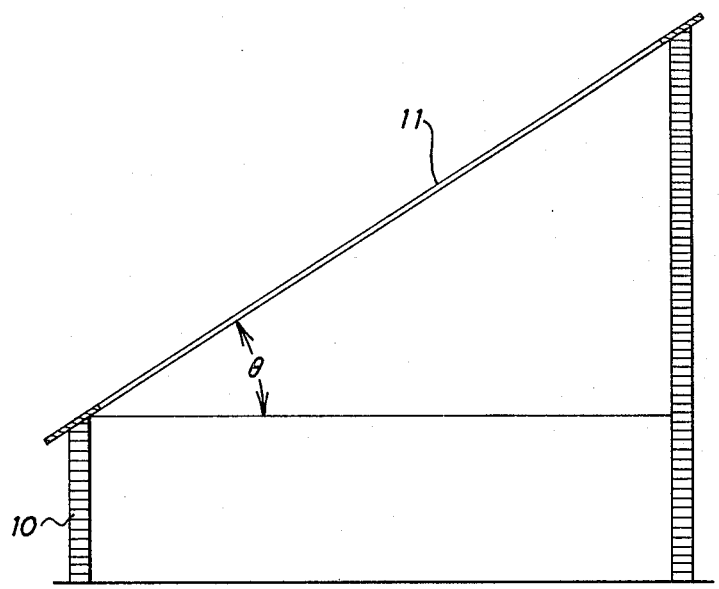
FIG. 1
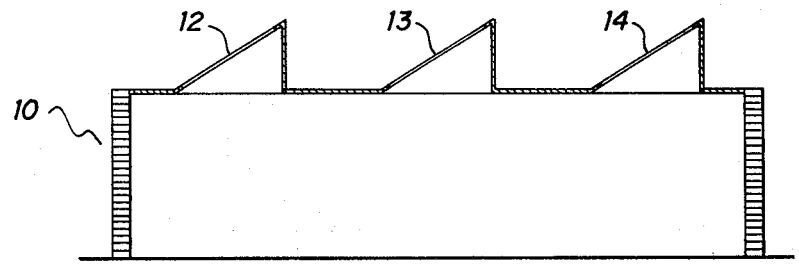
FIG. 2
FIG. 3
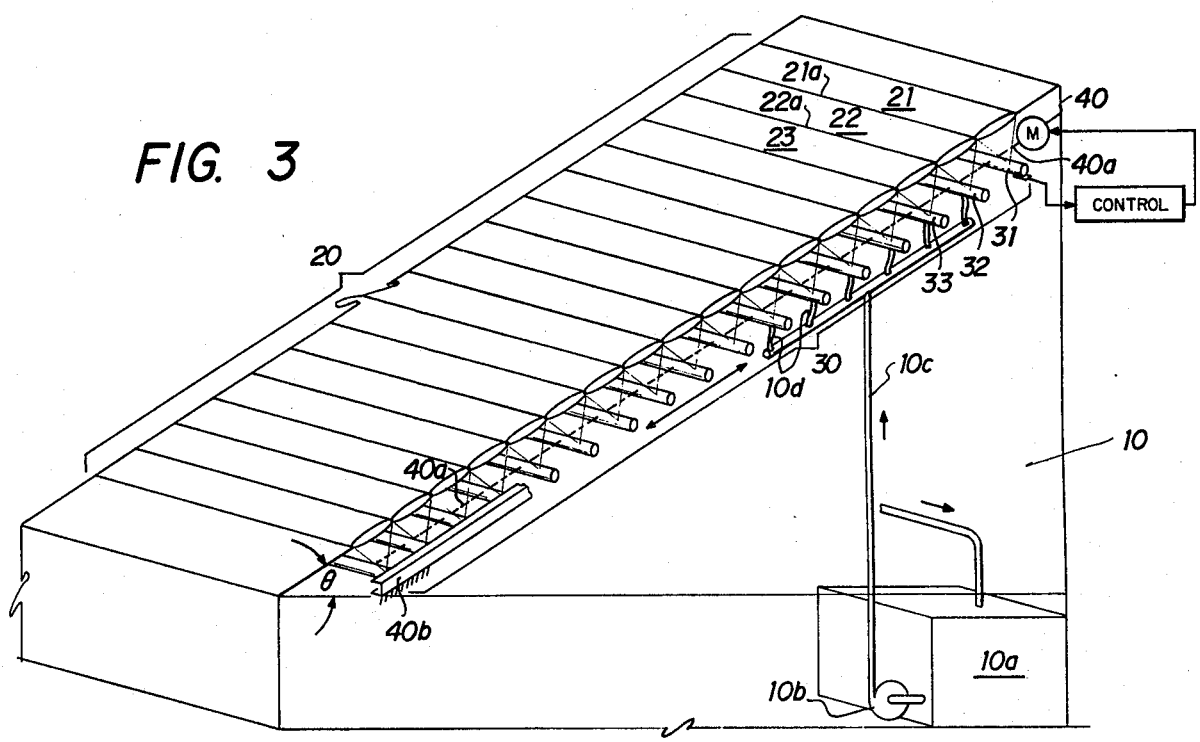

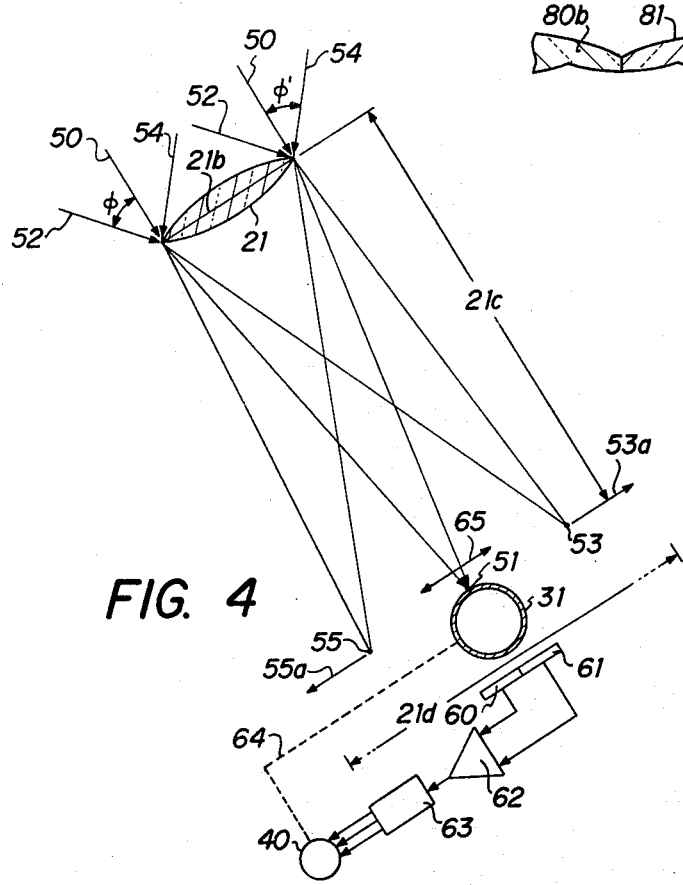
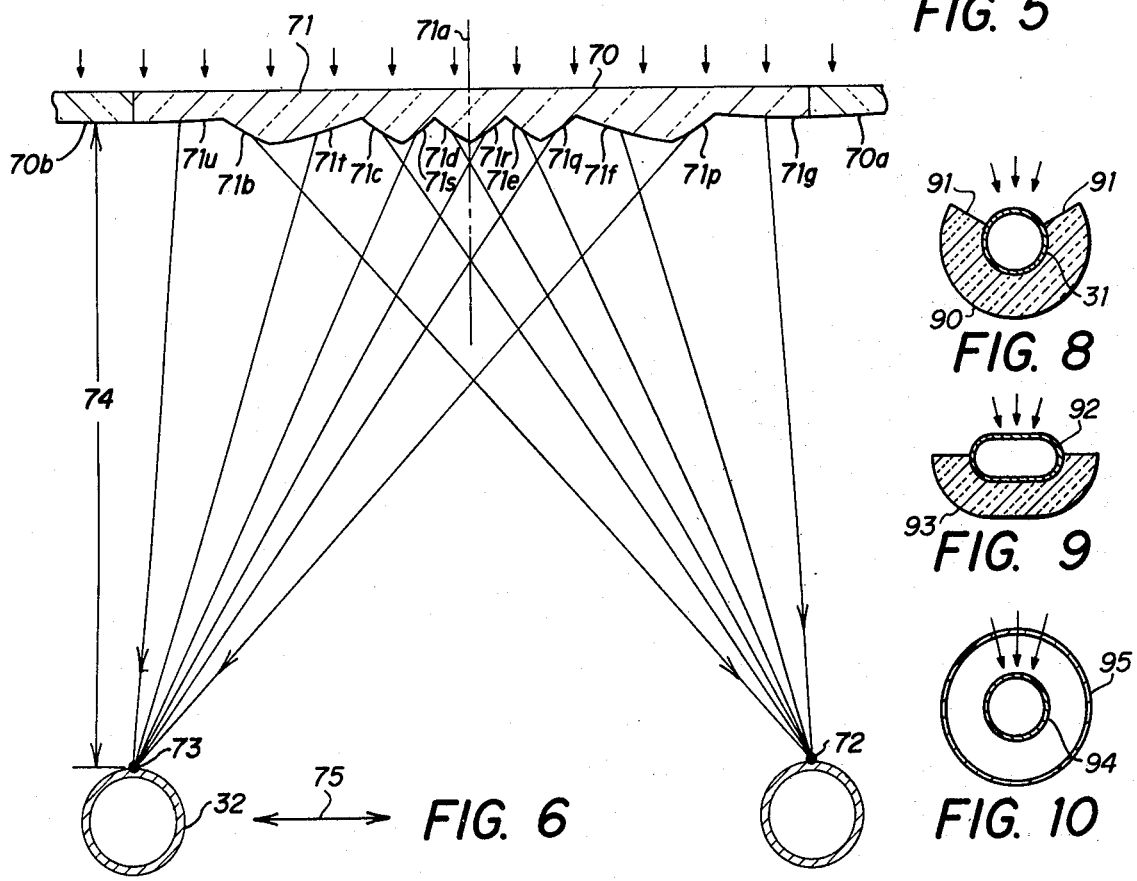
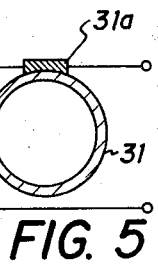
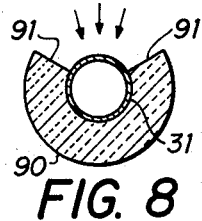
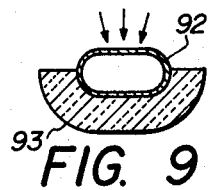
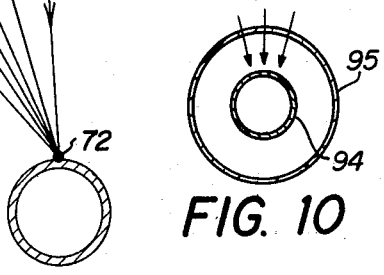

ROOF-LENS SOLAR COLLECTOR

This invention relates to conversion of solar energy, and more particularly to a roof-lens solar collector which in a preferred embodiment also provides for internal lighting of a building on which the lens system forms at least a portion of the roof.

Utilization of solar energy has been the object of investigation and development from the earliest of times. Applications wherein solar energy displaces current use of fossil fuels becomes a more significant objective as the supply of fossil fuel diminishes and as industrial and domestic needs for energy increase.

Heretofore there have been many structures devised and many systems proposed for making solar energy usable in economically competitive form for industries and homes. Solar energy capture and utilization and various forms of storage systems have been proposed. In prior application Ser. No. 523,220, filed Nov. 13, 1974 for SOLAR ENERGY COLLECTOR, abandoned, a system is disclosed employing a Fresnel lens mounted in such a manner as to track the sun's path across the sky while focusing at all times the sun's rays by means of the lens onto a heat absorbent element. The relatively high efficiency of such a system has made possible the utilization of solar energy for many purposes not heretofore accomplished even though many systems having prospects of success have been disclosed in the literature.

The present invention is directed to a system in which a surface portion of a structure such as a building is formed by a panel comprising an array of lenses. The panel preferably is tilted at an angle corresponding to the latitude of the location of the structure as to receive the sun's rays axially at equinox. The panel is formed by a plurality of cylindrical lenses whose horizontal axes extend east-west. Identical lenses refract incident radiation onto a line at the focal point of each lens. An array of linear heat absorbers, at least one absorber for each lens, is mounted within the structure below the lens array at the focal points of the lenses. Thus, one element is at the focal point for each lens. The array of absorbers are mounted for movement on a daily basis to compensate for variation in the sun's elevation angle relative to the lens. By this means, the energy from the sun's rays concentrated onto the absorbers may be utilized by means of heat transfer mechanisms for utilization in any of the various ways heretofore suggested.

In a more specific aspect, the invention comprises an elongated generally cylindrical lens to concentrate parallel incident rays of light onto a focal line with means fixedly mounting the lens with its lateral axis tilted to local latitudes and its longitudinal axis in an east-west direction. An elongated linear heat absorbent element is positioned below the lens at its focal distance. Control means responsive to variation in the elevation angle of the sun relative to the lens in its daytime travel varies the north-south position of the element to maintain it at the line along which the lens focuses the incident parallel rays.

In a further aspect, the invention comprises a building having as a roof structure a light transmitting panel facing south in northern hemisphere, north in southern hemisphere and inclined at an angle corresponding to local latitude and formed of a plurality of side-by-side generally cylindrical lenses whose axes extend east-west. The heat absorbing array of elements is mounted below the panel to receive light concentrated by the lenses onto parallel lines within the structure with means responsive to daily changes in the sun's elevation angle relative to the lenses to maintain the elements of the array at all times at the focus of the sun's rays by the lenses thereby to provide heat input which is captured and at the same time providing light input to the building.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1 illustrates a building in which an entire roof structure is formed of a roof-lens system for collecting solar energy;

FIG. 2 illustrates a modified form of building roof structure embodying the invention;

FIG. 3 is an isometric view partially in section illustrating the structure utilized in the systems of FIGS. 1 and 2;

FIG. 4 diagrammatically illustrates variations in the position of the focus of light rays impinging the lens from various angles as characteristically encountered during operation in the environments of FIGS. 1 and 2;

FIG. 5 illustrates use of a photo voltaic cell as a solar energy absorber;

FIG. 6 illustrates a modified form of cylindrical lens;

FIG. 7 illustrates another embodiment of the lens of FIG. 6;

FIG. 8 illustrates a sectional view of a collector of preferred configuration;

FIG. 9 illustrates a modification of the collector of FIG. 8; and

FIG. 10 illustrates a further modification of the collector of FIG. 8.

Referring now to the drawings, FIG. 1 illustrates a building 10 to which the present invention is used. The roof structure 11 is tilted at an angle corresponding to local latitude. In accordance with the present invention, the roof 11 comprises in whole or at least in part one or more panels of cylindrical lenses the structure and configuration of which will be described herein. The lenses are longitudinally horizontal extending in the east-west direction. The lenses serve to focus incident sun's rays onto parallel lines inside the building where the energy is then captured. So far as not captured, light passing through the lens system is utilized to form interior illumination of building 10.

In FIG. 1 the entire roof 11 is illustrated as comprising a single slope and may be totally or at least in part formed of the cylindrical lens panels embodied in the present invention.

In FIG. 2 building 10 has a horizontal roof structure with a plurality of tilted lens sections 12, 13 and 14 mounted in structure like skylights. Each of the sections 12–14 comprises panel structures of cylindrical lenses to bring the incident sun's rays to linear focus lines.

FIG. 3 is an illustration of a portion of one panel. Panel 20 comprises a plurality of lenses which are integral one with another to form a weathertight body. For example, lenses 21 and 22 are joined together or are common at the boundary 21a. Lenses 22 and 23 join at boundary 22a. The longitudinal axes of the lenses 21–23 are horizontal and extend in east-west direction.

The entire panel 20 is tilted at an angle $\theta$ preferably corresponding with the local latitude at which the building 10 is located.

By way of example, the individual lenses such as lens 21 may have a major axis of the order of 6 inches in length and a minor axis of about ½ inch. Panels formed of such lenses may be of the order of 5 feet wide and 10 feet long. It will be apparent, however, that there is no necessary limitation on the lens size or the panel width or length other than the physical parametric considerations generally applicable to use of structures employing glass panels.

Further in accordance with the present invention, an array 30 of solar energy absorbers is provided. Array 30 comprises longitudinal tubes such as the tubes 31, 32 and 33. Tube 31 is mounted in a suitable support system, not shown, as to be movable under the control of an actuator 40 so that absorbers 31, 32 and 33 will always be positioned at the point at which the sun's rays incident upon the lenses 21, 22 and 23, respectively, are focused. This concentration of the sun's rays thus provides for an efficient collection of solar energy by tubes 31-33 as concentrated by lenses 21-23.

As above noted, the array 20 is tilted at an angle $\theta$ of approximately the latitude angle at which the building is located. The angle may be varied, however, for any given latitude and the control of an actuator 40 adjusted to accommodate the differences thus involved. Actuator 40 is coupled to array 30 by way of an interconnecting linkage 40a which ties the members of array 30 together to form a unitary structure. A similar linkage (not shown) may be provided on the other end of array 30. Suitable supports 40b such as a track channel over which the array travels may be made part of the building structure. Actuator 40 is controlled to move array 30 to compensate for variations in the sun's elevation angle relative to the lens array.

The need for such compensation is illustrated in FIG. 4. The operation of lens 21 has been illustrated for various angles of incident radiation assuming location in the northern hemisphere where the major axis 21b of lens 21 is tilted to face south. The angle of tilt preferably is exactly the latitude at which the lens is located. The longitudinal axis of the lens 21 is to be oriented in a true east-west direction. At equinox, during the entire course of the sun in its east-west daytime path, the incident light energy would be as depicted by rays 50. In such case, the incident rays 50 are focused onto a focal line 51. In such case, the element 31 would be stationary during the entire day, i.e., at a fixed location to receive and absorb the solar energy concentrated at the focal line 51.

During the winter solstice, sun rays 52 at midday would be at an angle $\phi$ of approximately 23.5°. At that time of day, the rays 52 would be concentrated at point 53. Before and after noon, however, the angle $\phi$ would be greater than 23.5° and the point 53 would be located outward in the direction of arrow 53a.

Similarly, in summer solstice, rays 54 at noontime would impinge the lens at an angle $\phi'$ of 23.5° resulting in focusing of the sun's rays at line 55. Before noon and after noon, the focal line 55 would be located outward in the direction of arrow 55a. Between equinox and solstice, the focal lines 53 and 55 would at noontime for each day be closer to the focal line 51 and the magnitude of variation in locations between sunrise and noon and between noon and sunset would be less than at solstice.

Elements of array 30, FIG. 3, are hollow tubes such as tube 31, FIG. 4. A heat transfer liquid flows through the tube for exchange of energy between array 30 and a utilization system. As shown, a heat utilization reservoir 10a is connected to receive flow of liquid from array 30. Pump 10b forces fluid through line 10c and manifold 10d to supply all the tubes of array 30. Reservoir 10a may be a water heater, for example.

In accordance with the invention, a control system is provided for the actuator 40 to control the north-south position of the array 30. The control system may be of the form diagrammatically illustrated in FIG. 4. A pair of light sensors 60 and 61 are mounted beneath the tube 21. The sensor outputs are then applied to a differential amplifier 62 whose output is applied by way of a power amplifier 63 to operate actuator 40 which is a differential actuator having a mechanical output coupled by way of linkage 64 to the element 31 so that the element 31 along with the other elements in the array 30 may be moved in accordance with arrow 65. The output from sensors 60 and 61 will at all times be nulled, indicating that the sun's rays are refracted to a line positioned centrally on the upper surface of the element 31.

The principles of feedback control systems, in general, are well known and will not further be described. In the present system, the control system functions to maintain the elements of the array 30 always to receive the sun's rays as focused by the lens elements of the array 20.

In FIG. 5, a modified form of solar energy receptor has been illustrated. In this form, tube 31 is provided with an electrical light responsive generator 31a which may be in the form of an elongated strip of photo voltaic elements formed, in accordance with current practices, of semiconductor material. Generator 31a is mounted directly on the surface of the tube 31. Tube 31 preferably is provided with the flow of a coolant fluid to maintain below a desired level the temperature of the strip of cells 31a and at the same time provide for transfer and utilization of heat necessarily removed from cells 31a for proper operation thereof. The importance of mounting photo voltaic cells at the focal point is that a very small quantity of such expensive devices can be used to absorb all of the focused energy.

In the example above described, cylindrical lens 21 with a major axis 21b of the order of 6 inches in length would have a focal distance 21c preferably of the order of 17 to 18 inches. The tracking path 21d would be of the order of 24 to 28 inches.

FIG. 6 illustrates a modified form of lens which may be used in place of the lens of FIG. 3. In FIG. 6 the amount of material used to make the lens and the weight of the lens would be significantly less than in the system of FIG. 3. Also, this lens is easy to cast or roll for fabrication. In the form illustrated in FIG. 6, the lens 70 has a planar face 71 and a Fresnel configured opposite face. The opposite face is symmetrical in the form shown about the minor axis 71a. It is formed of segments 71b–71g which refract light to the first focal line 72. A second set of segments 71p–71u refract light to a focal line 73. A series of lenses 70 in side-by-side relation are employed to form the panels employed in the structures of FIGS. 1 and 2. An adjacent panel 70a would focus half the incident sunlight to the focal line 72 and thus share line 72 with lens 70. An adjacent lens 70b would refract half of the sunlight incident thereto onto the focal line 73 and thus share line 73. In a panel made of a plurality of such lenses, there would be one focal line at each end of the array on which light from a single lens only is focused. All other lines would have light focused from two adjacent lenses. In the structure illustrated in FIG. 6, the element 32 of FIG. 3 would be mounted for movement in the direction of arrow 75 to accommodate variations in the sun's elevation angle relative to the lens system.

Lens 70, FIG. 6, has been illustrated as having a planar surface 71 and a Fresnel surface comprised of elements 71b–71g and 71p–71u. In FIG. 7, the lens is compound with the surface 81 of convex shape. A panel of lenses 80, 80a and 80b, etc. may be formed to provide a panel of bifocal linear lenses.

While the lens system 70 either in the planar form or the lens system 80 in the convex form has utility and may be used in place of the compound cylindrical lens of FIG. 3, the lenses 70 or 80 may be particularly suitable for other uses and are not limited specifically to the application indicated in FIGS. 1 and 2. For either the cylindrical lenses or the bifocal Fresnel lenses, the design of such lenses must allow for focusing sunlight incident at a variety of angles, comprising typically the range −40° to +40° yearly.

In either case where a roof-lens solar collector system is employed in accordance with the present invention, it will be desirable to provide reflectors at the ends of each array so that early morning and late afternoon sunlight will be reflected from the end panels onto the elements of the absorbing array 30. Such a reflector may take the form of a planar mirror having a width corresponding to the focal length 21c of FIG. 4 and spanning the distance between the inner surface of the array 20 and the upper surface of the array 30 with the plane of the mirror perpendicular to the longitudinal axes of arrays 20 and 30.

While in FIGS. 1–7 the collector tubes are shown as metal pipe, they preferably will be at least partially insulated as indicated in FIGS. 8–10. In FIG. 8, pipe 31 is illustrated with an insulating partial cylinder 90 extending the length of the tube 31. The tube 31 has the upper surface thereof exposed with the remainder covered by the insulator 90. The walls 91 preferably will be reflective so that any incident light would be reflected onto the exposed surface of the pipe.

As indicated in FIG. 9, the tubes need not be cylindrical. Rather, tube 92 of FIG. 9 is of oval shape with the upper half thereof exposed to incident radiation and the lower half encased in an insulating half oval body 93.

In FIG. 10, the tube 94 is housed within a transparent tube 95 with the annulus between tube 95 and tube 94 evacuated so that there will be little heat loss. Thus, the systems of FIGS. 8–10 represent structure in which an insulated pipe is employed and is preferred over the uninsulated pipes of FIGS. 1–7.

Having described the invention in connection with certain specific embodiments thereof, it is to be understood that further modifications may now suggest themselves to those skilled in the art and it is intended to cover such modifications as fall within the scope of the appended claims.

What is claimed is:

1. A solar energy collector which comprises:
   a. a fixed panel of light transmitting material mounted at a given latitude to face the remote earth pole and including a plurality of linear lenses the axes of which extend parallel one to the other in an east-west direction to focus the sun's rays onto a plurality of focal lines behind said lens,
   b. an absorbing array comprising a like plurality of linear solar energy absorbing elements, at least one linear element for each of said lenses, mounted beneath said panel at the focal distance of said lenses and oriented parallel to said lenses, and
   c. means to move said array in daytime to maintain each of said elements always at the focal point for a given lens in compensation for variations in the sun's elevation angle relative to said panel.

2. The combination set forth in claim 1 in which linkage means couples said elements to form an array in which said elements move in unison in a plane beneath and parallel to said panel.

3. The combination set forth in claim 1 in which said energy absorbing elements are tubes interconnected for flow of a heat exchange fluid between said array and utilization means.

4. The combination set forth in claim 1 in which said elements include photovoltaic cells facing said panel to receive energy from said rays.

5. The combination set forth in claim 3 in which photovoltaic cells are mounted on said tubes facing said panel to receive energy from said rays to produce an electrical energy output with said fluid serving to cool said cells and deliver heat energy to said utilization means.

6. The combination set forth in claim 1 in which said lenses are cylindrical lenses.

7. The combination set forth in claim 6 in which said lenses are compound cylindrical lenses.

8. The combination set forth in claim 1 in which said lenses are bifocal Fresnel linear lenses.

9. The combination set forth in claim 1 in which said lenses are formed of a multiplicity of parallel prisms which focus incident light upon two parallel lines.

10. The combination set forth in claim 9 in which said two parallel lines are in a common plane parallel to the plane of said panel.

11. A heating lighting structure comprising:
   a. a light transmitting panel at a given latitude facing the most remote of the earth's poles and inclined at an angle corresponding to local latitude and formed of a plurality of side-by-side generally cylindrical lenses whose axes extend east-west,
   b. means for mounting said panel to transmit light therethrough into said structure,
   c. an array of linear absorbing elements mounted inside said structure in side-by-side relation with at least one said element at the focal distance from each said lens, and
   d. means responsive to daily changes in the elevation angle of the sun relative to said panel to vary the location of said array relative to said panel to maintain said elements at the focus of the sun's rays by said lenses.

12. The combination comprising:
   a. an elongated generally cylindrical lens to concentrate parallel incident rays of light onto a focal line,
   b. means fixedly mounting said lens with its major axis tilted to local latitude to face the most remote of the earth's poles and its longitudinal axis east-west,
   c. an elongated linear heat absorbent element below and parallel to said lens at the focal distance thereof, and d. means responsive to variations in the elevation angle of the sun relative to said cylindrical lens in its daytime travel to vary the north-south position of said element to maintain it at the point of focus of the sun's rays.

13. A bifocal linear lens comprising a multiplicity of parallel prisms which focus incident sunlight upon two parallel lines lying in a common plane beneath said lens.

14. The combination set forth in claim 13 in which said lens has a planar face subject to incident radiation.

15. The combination set forth in claim 13 in which said lens has a convex face subject to incident radiation.

16. In the conversion of solar energy, the method comprising:
 a. refracting, in an east-west oriented layer tilted to local latitude to face the most remote of the earth's poles, incident solar radiation to focus said radiation to a plurality of east-west lines common to a focal plane beneath said refracting plane,
 b. positioning interceptors for said rays along said lines to absorb heat from said rays at one time of day, and
 c. moving said interceptors to compensate for changes in north-south positions of said lines due to variation in the elevation angle of the sun relative to said refracting layer.

* * * * *